United States Patent
Zaffino

Patent Number: 5,603,186
Date of Patent: Feb. 18, 1997

[54] ROOF STABILIZATION SYSTEM

[76] Inventor: Saverio Zaffino, Box 5603 R.D. #5, Moscow, Pa. 18444

[21] Appl. No.: 453,493

[22] Filed: May 30, 1995

Related U.S. Application Data

[63] Continuation of Ser. No. 89,451, Sep. 10, 1993, abandoned.

[51] Int. Cl.$^6$ ........................................................ E04B 7/00
[52] U.S. Cl. ........................... 52/23; 52/293.3; 52/295; 52/DIG. 11
[58] Field of Search ................................. 52/4, 223.1, 295, 52/293.1, 293.3, 169.9, 23, 2.25, DIG. 11

[56] References Cited

U.S. PATENT DOCUMENTS

| | | | |
|---|---|---|---|
| 269,018 | 12/1882 | Crowell et al. | 52/23 |
| 314,367 | 3/1885 | Cook | 52/223.1 X |
| 354,342 | 12/1886 | Pratt | 52/23 X |
| 362,774 | 5/1887 | Nevison | 52/223.1 X |
| 777,441 | 12/1904 | Small | 52/23 |
| 1,864,403 | 6/1932 | Bradley | 52/23 X |
| 3,335,531 | 8/1967 | Grimelli et al. | 52/23 |
| 3,398,491 | 8/1968 | Babcock | 52/293.3 X |
| 3,726,054 | 5/1973 | Anderson et al. | 52/23 |
| 3,757,475 | 9/1973 | Hackworth | 52/4 X |
| 3,830,024 | 8/1974 | Warnke | 52/23 |
| 3,852,931 | 12/1974 | Morse et al. | 52/293.3 |
| 3,879,905 | 4/1975 | Catalano, Sr. | 52/23 |
| 3,894,365 | 7/1975 | Abbott | 52/23 |
| 3,943,670 | 3/1976 | Miller | 52/23 |
| 5,060,436 | 10/1991 | Delgado, Jr. | 52/295 |
| 5,150,553 | 9/1992 | Commins et al. | 52/295 X |
| 5,355,640 | 10/1994 | Frye | 52/23 |
| 5,384,993 | 1/1995 | Phillips | 52/293.3 |
| 5,448,861 | 9/1995 | Lawson | 52/293.3 |

Primary Examiner—Carl D. Friedman
Attorney, Agent, or Firm—Staas & Halsey

[57] ABSTRACT

A roof stabilization system for securing the roof of buildings to prevent loss during storms and other natural disasters. A plurality of metal bands are provided which extend across the roof of the building and down the sides to be secured in or near the foundation of the building. For installation in new constructions utilizing footers, an anchor is embedded in the foundation and extends through the sill. The metal bandings are attached to the anchors between the foundation and the sill. For installation in new structures which do not utilize footer, for example, buildings with cinderblock walls, the anchors are embedded into the foundation and extend through the bottom of the wall. In this case, the metal bandings are secured to the anchors between the wall and the foundation. For installation onto existing structures, footers are buried below the ground level running the length of the building with anchors embedded therein which extend above ground. In such a case, strong back supports are provided on the roof to provide additional support and stability. For temporary installation, nylon webbing can be utilized, extending both crosswise and lengthwise across the construction.

10 Claims, 6 Drawing Sheets

ROOF STABILIZATION SYSTEM

This application is a continuation of application Ser. No. 08/089,451, filed Sep. 10, 1993, now abandoned.

BACKGROUND OF THE INVENTION

Field of the Invention

The present invention relates to a roof stabilization system for securing the roofs of buildings to prevent loss during storms, and more particularly, to a roof stabilization system which is adaptable for installation on existing structures and as part of new structures.

SUMMARY OF THE INVENTION

Accordingly, it is an object of the present invention to provide a roof stabilization system for permanent installation onto existing structures.

It is another object of the present invention to provide a roof stabilization system for temporary installation onto existing structures.

It is a further object of the present invention to provide a roof stabilization system for installation onto new structures.

Additional objects and advantages of the invention will be set forth in part in the description which follows, and, in part, will be obvious from the description, or may be learned by practice of the invention.

Objects of the present invention are achieved by providing a roof stabilization system for installation into a new structure having a roof supported by a wall supported by a foundation, the roof stabilization system comprising a plurality of anchor bolts embedded in and extending from the foundation wall, the anchor bolts being positioned in pairs, one of each pair being positioned on each side of the structures; and a plurality of bands extending between the pairs of anchor bolts over the roof of the structure, the bands being attached to the anchor bolts between the foundation wall and the wall.

Further objects of the present invention are achieved by a roof stabilization system for installation onto an existing structure having a roof supported by a wall supported by a foundation, the roof stabilization system comprising a plurality of anchors secured into and extending from the ground around the structure, the anchors being positioned in pairs, one of each pair being positioned on each side of the structure and a plurality of bands extending between the pairs of anchors over the roof of the structure.

BRIEF DESCRIPTION OF THE DRAWINGS

These and other objects and advantages of the invention will become apparent and more readily appreciated from the following description of the preferred embodiments, taken in conjunction with the accompanying drawings of which;

FIG. 1(A) is a partial side cut-away view of a peak roof section adapted for use with the roof stabilization system in accordance with the first preferred embodiment.

DESCRIPTION OF THE PREFERRED EMBODIMENTS

Figure 1:
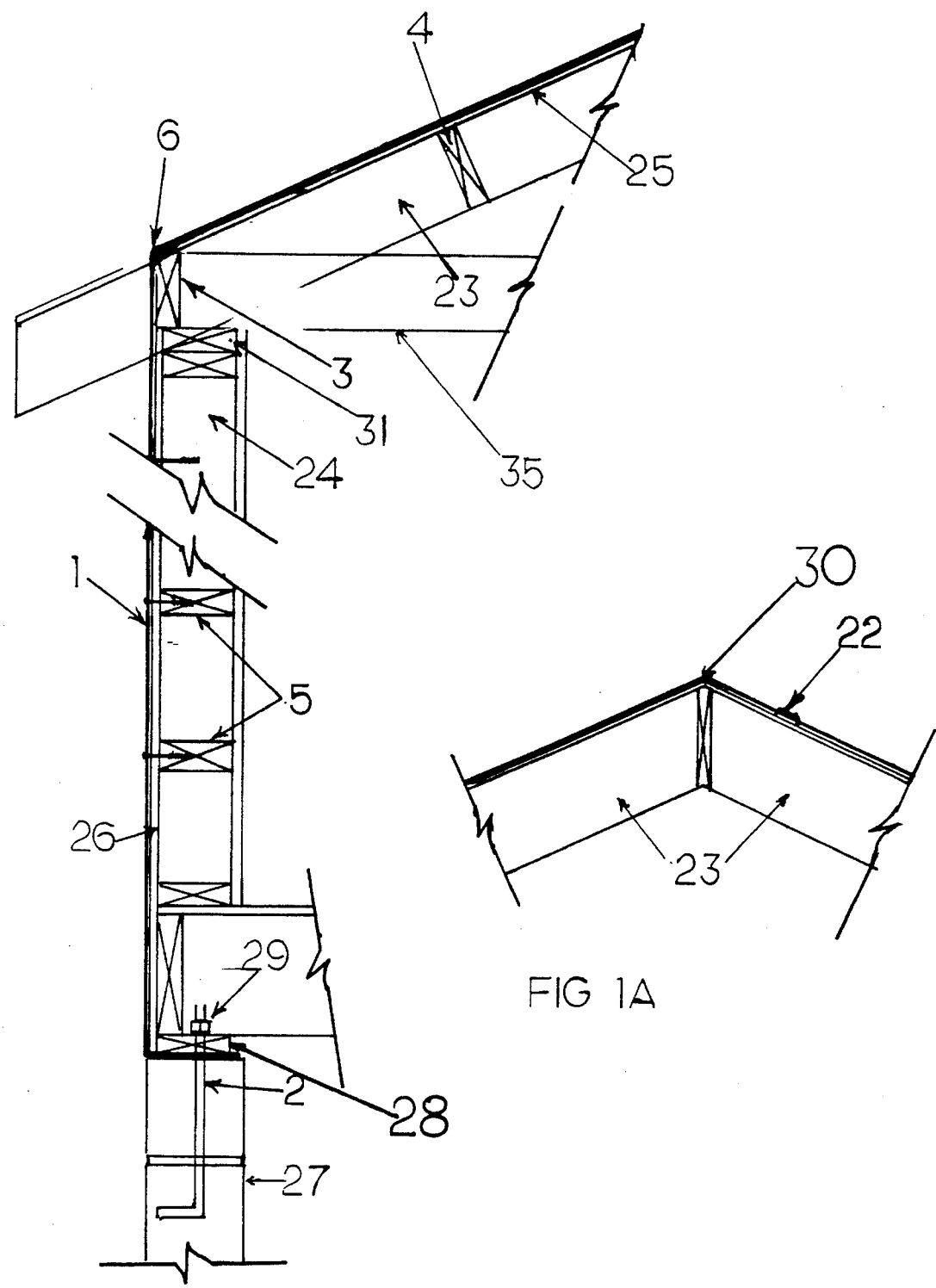
FIG. 1 is a partial side cut-away view showing a roof stabilization system for installation in new structures according to a first preferred embodiment of the present invention.

Reference will now be made in detail to the present preferred embodiments of the present invention, examples of which are illustrated in the accompanying drawings wherein like reference numerals refer to like elements throughout.

FIG. 1 and FIG. 1(A) are partial side cut-away views of the first preferred embodiment of the present invention as installed during the construction of a new building which uses a footer. A metal banding, preferably 4" by 1/16" having a hole approximately 2" from its end, is fixed over an anchor bolt 2 and held between a foundation wall 27 and a sill plate 28. The metal banding 1 is secured to the anchor bolt 2 by a nut 29. The anchor bolt 2 is cemented in the foundation wall 27. The metal banding 1 follows the sidewall sheeting 26 which is fastened to the wall studs 24 which are reinforced by a blocking 5 between the wall studs 24. The metal banding 1 then follows a slot 6, preferably 4 and 1/4" wide by 1/8" deep, cut in the roof sheeting 25 and extends beyond the roof peak 30 by approximately 12". It will be understood by one skilled in the art that the same layout is followed on the opposite side of the building. The metal bandings 1 are pulled tight and a set of metal crimping clips 22 are installed, thereby insuring the uniformity and integrity of the tension of the metal bandings 1.

It is imperative that a plurality of blocking 3 be fastened between the roof rafters 23 to a top wall plate 31 in line with the sidewall sheeting 26. The blocking 3 provides reinforcement for the roof sheeting 25 where the metal banding 1 applies a substantial amount of pressure. The blocking 4 is secured between the roof rafters 23 wherever the a metal banding 1 crosses the roof sheeting 25. The metal banding 1 is preferably applied every 4', except for window and door openings. However, the metal banding 1 should be installed near the door and window openings whenever possible.

Figures 2, 2A:
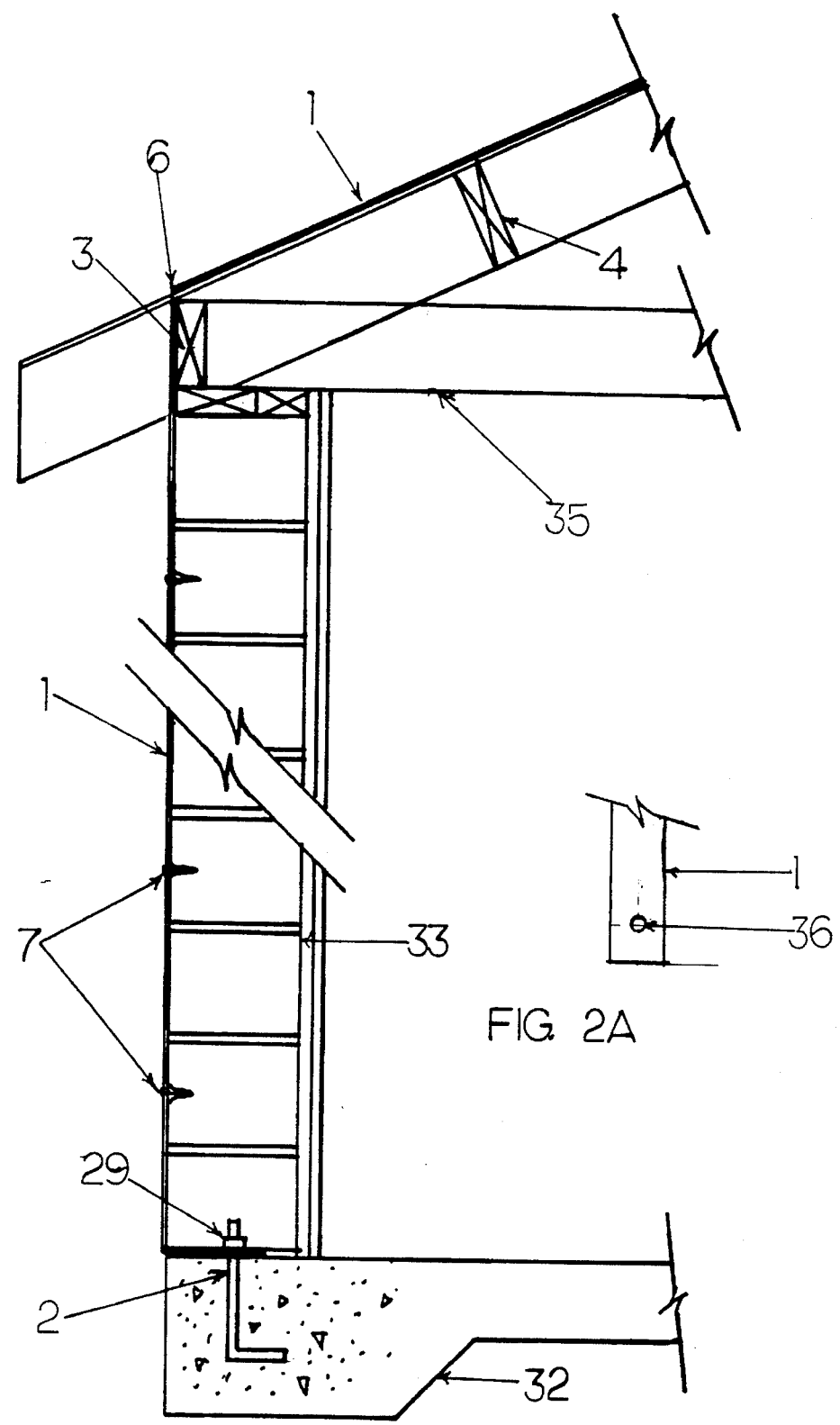
FIG. 2 is a partial side cut-away view of a roof stabilization system for permanent installation into a new construction according to a second preferred embodiment of the invention.
FIG. 2(A) is an end view of a metal banding adapted to accept an anchor bolt in accordance with a preferred embodiment of the present invention.

FIG. 2 shows a second embodiment of the present invention as installed on a typical warm climate construction, which are usually built on a slab without the benefit of a footer. An anchor bolt 2 is embedded in a monolithic concrete pour 32 during construction, using a masonry (cinder block) wall 33. It will be understood that the metal banding 1 is secured to the anchor bolt 2 as was described with reference to FIG. 1. The metal banding I also is secured to the masonry wall 33 by means of lead shields, preferably 2", and screws 7. A plurality of blocking 3 and 4 are installed as described with reference to FIG. 1. A plurality of crimping clips (not shown) are utilized to insure the integrity of the tension of the metal bandings 1 as described with reference to FIG. 1. The metal banding 1 is preferably repeated every 4' except for over door and window openings. However, the metal banding 1 should be installed near the door and window openings whenever possible.

Figure 3:
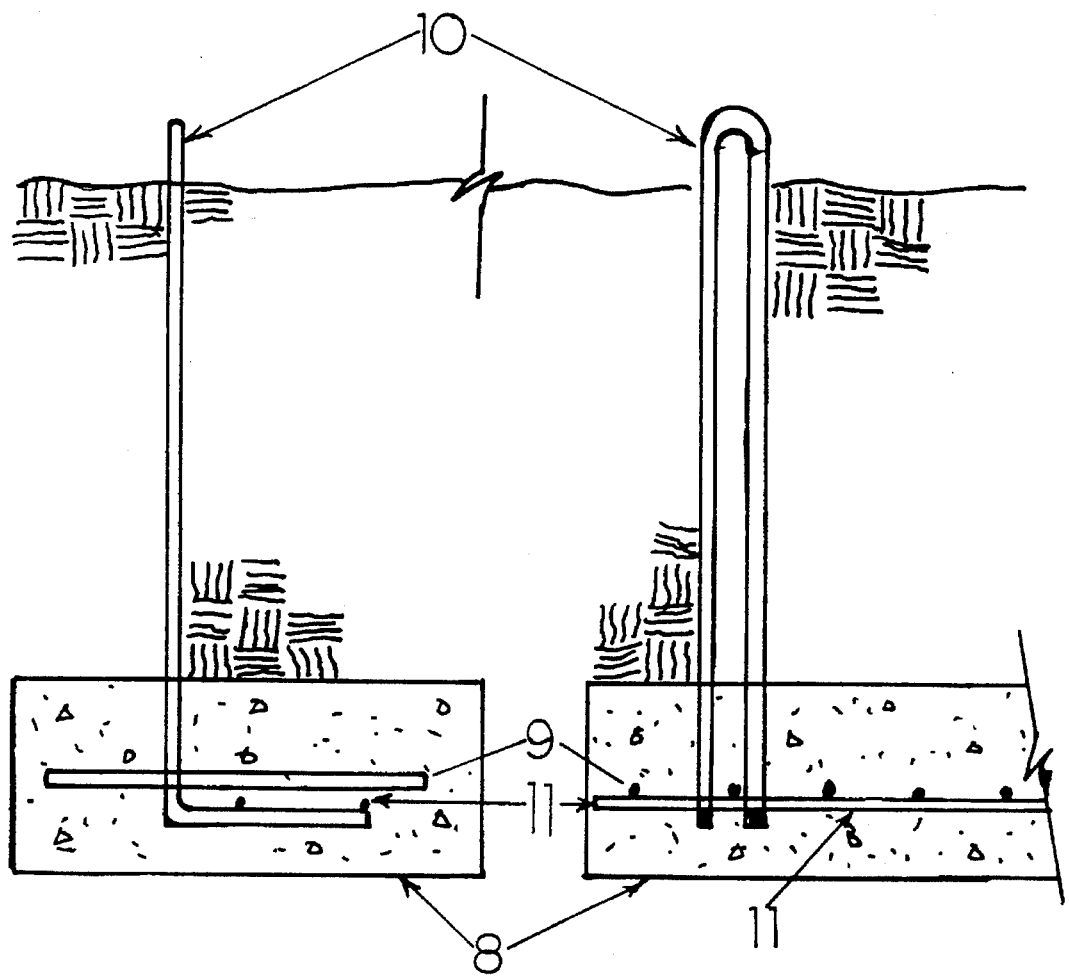
FIG. 3 is an end view and a side view of a concrete footer layout with rebar loops in accordance with a third preferred embodiment of the present invention.

FIG. 3 shows side cut-away views of concrete footers 8 for use in permanently installing the roof stabilization system onto an existing structure in accordance with a third preferred embodiment of the present invention. The concrete footers 8 are preferably poured three feet below ground level and are 30" in width by 12" in depth running the entire length of the existing structure. Imbedded in each of the concrete footer 8 is a curtain, preferably of #6 rebar 11, which runs the entire length of the concrete footer 8. The rebars 11 are placed equidistant from the outer edges of the concrete footer 8 and cross back at right angles every 6". On center is an additional rebar 9, 24" in length to complete the curtain. A further rebar 10 is shown vertically imbedded in the concrete footer 8 for connection to a plurality of metal bands 1. Additional rebars 10 are imbedded every 4' in the concrete footer 8, with allowances for door and window openings. The rebars 10 have right angle bases which are placed beneath the rebars 9 & 11, forming the curtain to provide maximum hold down. The rebar 10 is provided with a continuous loop that protrudes approximately 6" above ground to accommodate the tie-down end of the metal banding 1.

Figures 4, 5:
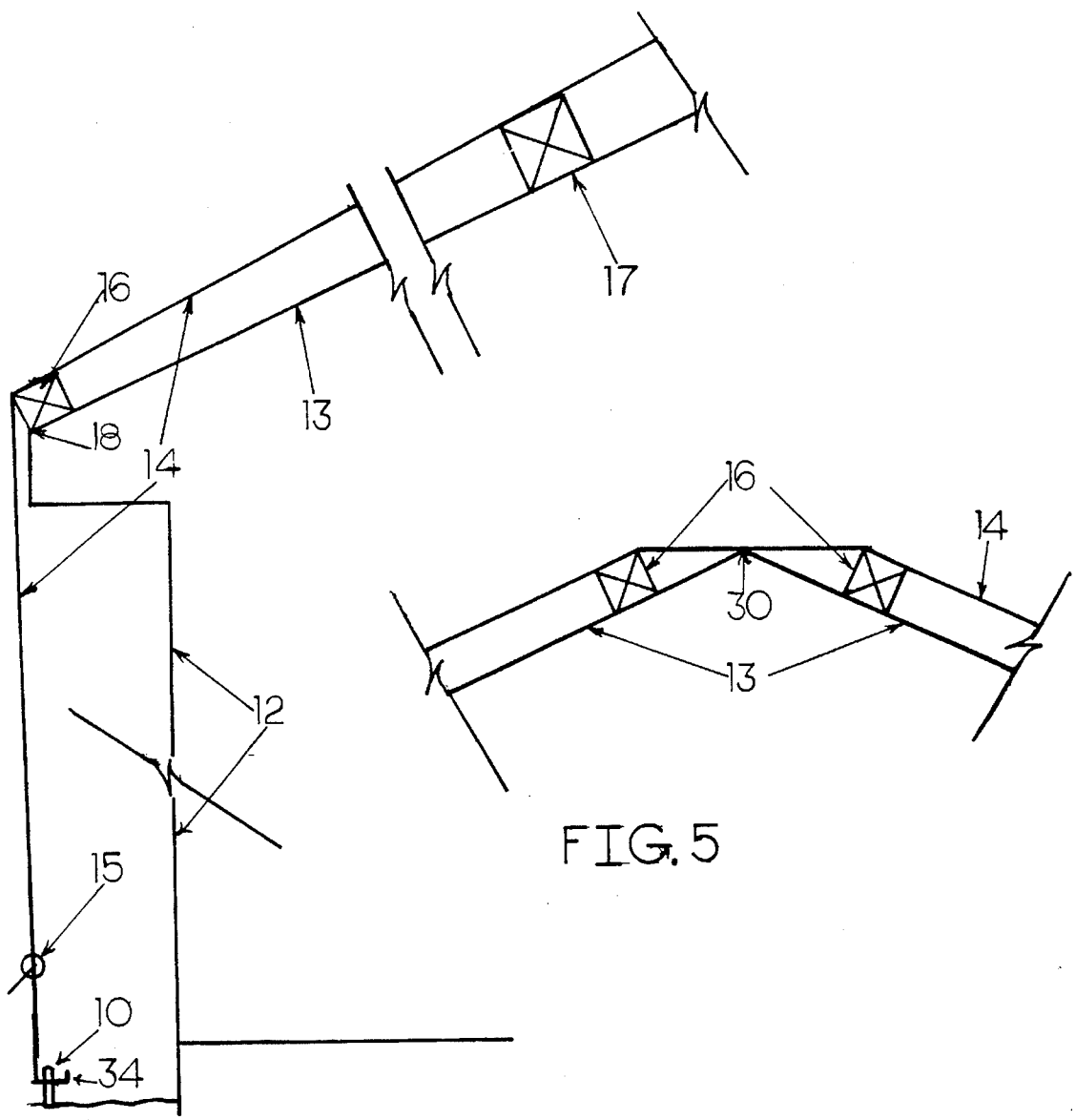
FIG. 4 is a partial side cut-away view of a roof stabilization system for use on existing structures in accordance with the preferred embodiment of the present invention.
FIG. 5 is a partial side cut-away view of an existing roof structure for use with the roof stabilization system in accordance with the third preferred embodiment.

FIG. 4 shows a permanent installation of the roof stabilization system on an existing building in accordance with the third embodiment of the present invention. A set of strongback roof supports 16, preferably 4" and a set of strongback roof supports 17, preferably 6" are placed parallel to a roof peak 30. One strongback roof support 16 is placed approximately 12" from and parallel to the roof peak 30. Another strongback roof support 16 is placed on the roof dripedge 18. A strongback roof support 17 is placed equidistant between and parallel to the strongback roof support 16. The strongback roof supports 16 & 17 are preferably manufactured of aluminum and are square in shape. A plurality of stainless steel bands 14 are then applied to the building in a manner similar to the manner in which the metal banding 1 was applied in the first embodiment. However, the stainless steel bands 14 are secured at ground level to the rebar 10 by use of a "j" hook 34. Further, the stainless steel bands 14 are placed on top of the "strongback roof supports" 16 & 17, as shown in FIG. 5, rather than flush against the roof sheeting 25.

Figure 6:
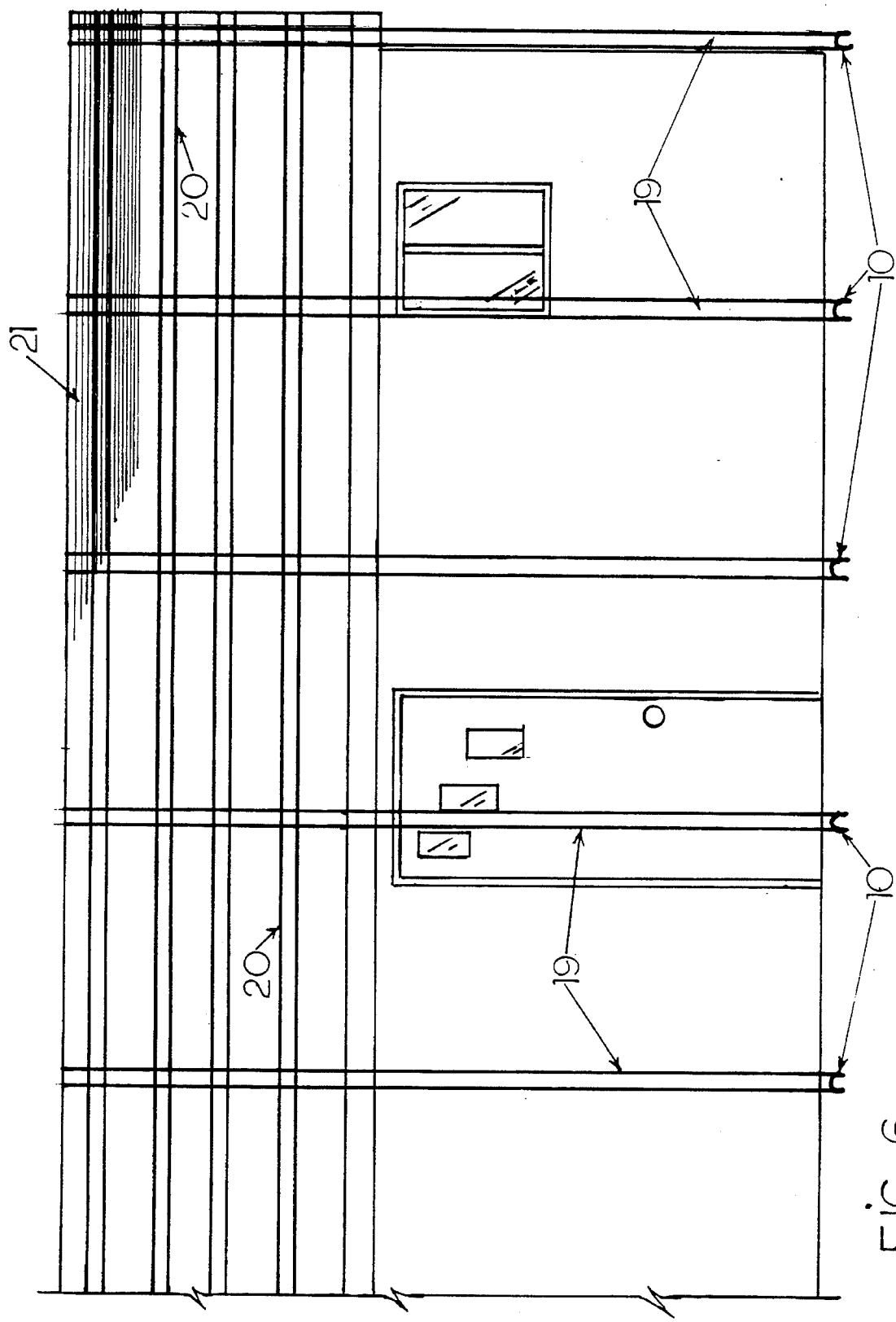
FIG. 6 is a side view of an existing building structure having a temporary roof stabilization structure installed thereon in accordance with a fourth preferred embodiment of the invention.

FIG. 6 shows a temporary installation of a roof stabilization system on an existing building using nylon webbing 19 & 20, in accordance with a fourth embodiment of the present invention. It will be understood that the rebar system and anchoring of same into the ground is done in the same manner as described with reference to FIG. 3. The nylon webbing is applied both horizontally 20 and vertically 19 on the roof 21 of an existing building. The vertical nylon webbing 19 and the horizontal nylon webbing 20 are fastened to the rebar 10 at the front and one side of the building using a "j" hook 34, and are secured at the back and side of the building by using a ratcheting tension binding device 15 (see FIG. 7).

Figure 7:
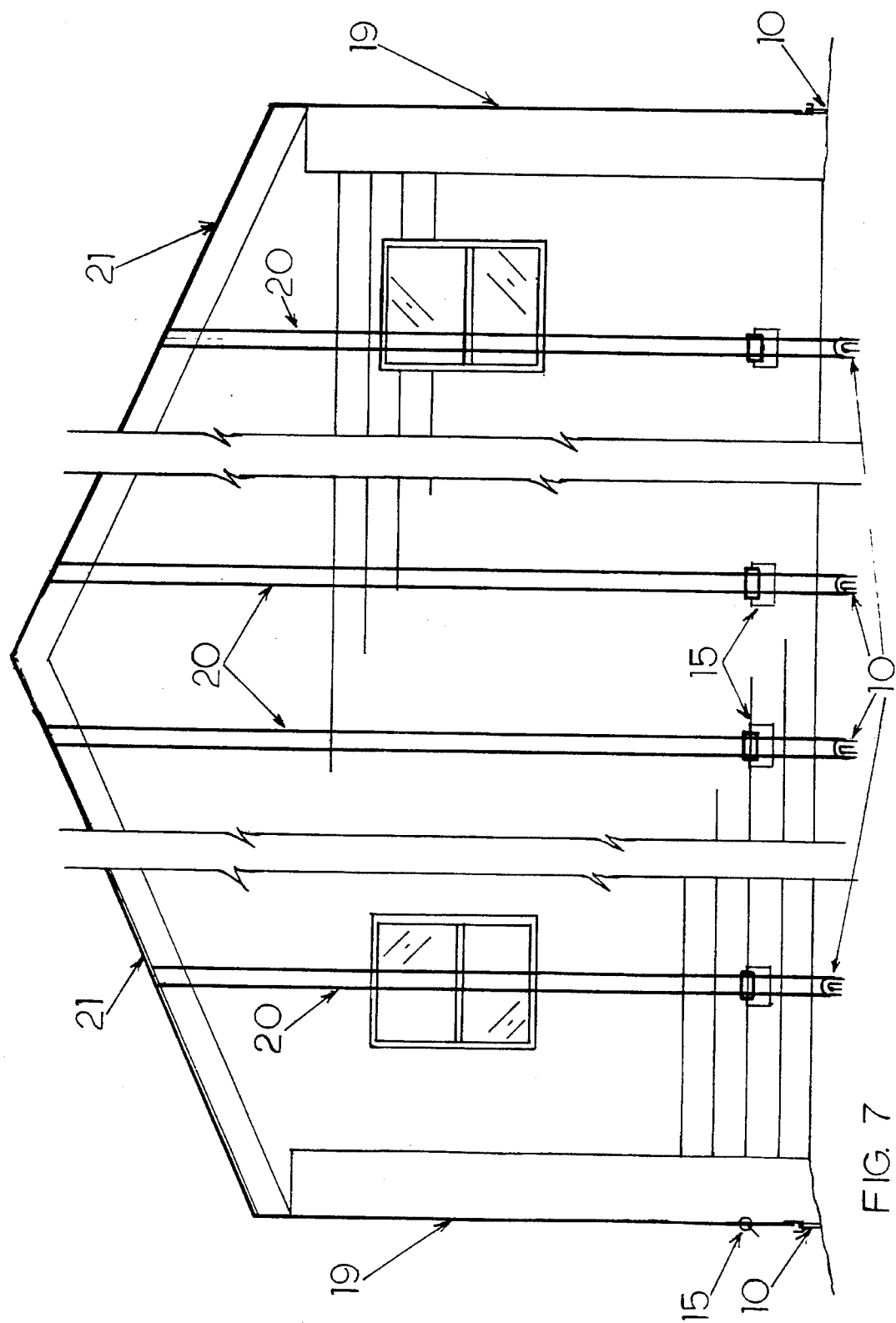
FIG. 7 is a side view of an existing building structure having a temporary roof stabilization structure, in accordance with the fourth embodiment of the present invention, installed thereon.

FIG. 7 shows the gable end of a building having a temporary roof securing system in accordance with the fourth embodiment of the present invention. The ratcheting tension binding device 15 is shown for tightening the horizontal 20 and vertical 19 nylon webbing to the rebar 10.

I claim:

1. A structure having a roof stabilization system comprising:

a foundation;

a wall supported by said foundation;

a roof supported by said wall;

a plurality of anchor bolts embedded in and extending from said foundation, said anchor bolts being positioned in pairs, one of each pair being positioned on each side of the structure; and a plurality of bands extending between said pairs of anchor bolts over said roof of the structure, the bands being attached to said anchor bolts between said foundation and said wall.

2. A structure, as set forth in claim 1, further comprising:

blocking reinforcing the portions of said wall over which said bands extend.

3. A structure as set forth in claim 1, further comprising:

blocking being positioned where said roof meets said wall.

4. A structure, as set forth in claim 1, wherein said roof is provided with a plurality of slots through which said bands extend.

5. A structure, as set forth in claim 1, wherein said bands are stainless steel.

6. A structure, as set forth in claim 1, wherein said anchor bolts are L-shaped.

7. A structure, as set forth in claim 1, wherein a pair of anchor bolts are provided every four feet along each side of the structure.

8. A structure, as set forth in claim 1, further comprising:

a plurality of screws securing said banding to said wall.

9. A structure, as set forth in claim 8, wherein said wall is a cinderblock wall.

10. A structure, as set forth in claim 1, wherein said wall rests on a sill plate which is supported by said foundation, said anchor bolts extending into the sill plate and said bands being attached to said anchor bolts between said foundation and the sill plate.

* * * * *